Patented June 5, 1951

2,555,646

UNITED STATES PATENT OFFICE 2,555,646

POLYMERIC THERMOREVERSIBLE GELS

Giffin D. Jones, Easton, Pa., assignor to General Aniline & Film Corporation, New York, N. Y., a corporation of Delaware No Drawing. Application May 2, 1947,
Serial No. 745,651

10 Claims. (Cl. 260—65)

This invention relates to the polymeric thermo-reversible gels prepared by treating a water-soluble polymeric material containing a free keto group with a polyhydrazide of a polycarboxylic acid and the process of producing the same, and photographic products produced therefrom.

I have found that novel thermo-reversible gels which are of especial value in photography as gelatin substitutes are readily obtained by treating an aqueous solution of a water-soluble polymeric material containing a free keto group with an aqueous solution of a polyhydrazide of a polycarboxylic acid at a pH not higher than 7 and preferably within the range of 2.5 to 6.

A wide variety of polymeric materials containing free keto groups may be employed as one of the reactants in producing the novel thermo-reversible gels of the present invention. As examples of preferred polymeric materials containing free keto groups which may be employed in practicing the present invention may be mentioned the water-soluble products obtainable by acylating a vinyl polymer containing free hydroxyl groups, i. e. a water-soluble polyvinyl alcohol e. g. partially or completely hydrolized polyvinyl acetate, with an acylating agent having a keto group in the acyl residue. A number of specific polymers of this type are disclosed in my copending application, filed May 2, 1947, Serial No. 745,648, and they may be obtained by acylating a water-soluble polyvinyl alcohol, preferably one having a viscosity (4% solution) ranging from about 10–50 centipoises at 20° C. with a 1-butene-1,3-dione. In order to be satisfactory for use in the present invention, the acylated polyvinyl alcohol must be water-soluble and, as described in my said copending application, the extent to which the polyvinyl alcohol is acylated while still retaining its water solubility will depend to a large degree on the viscosity of the particular polyvinyl alcohol employed. Thus, a water-soluble polyvinyl alcohol having a viscosity (4% aqueous solution) of less than 15 centipoises at 20° C. can be acylated to the extent that 40% of the available hydroxy groups are esterified while still obtaining water-soluble products while a polyvinyl alcohol having a viscosity (4% aqueous solution) of about 40 centipoises at 20° C. can be acylated to about 10% to give water-soluble products. In general, the products obtained by acylating water-soluble polyvinyl alcohols having viscosities ranging from 15–30 centipoises at 20° C. to the extent where from 4.5% to 10% of the available hydroxy groups are acylated with a β-keto acid are preferred. A second type of polymeric material containing a free keto group, which is suitable for use in practicing the present invention, are the water-soluble interterpolymers of amides of β-oxocarboxylic acids and β,γ-ethylenically unsaturated lower aliphatic amines, i. e. amides of the general formula:

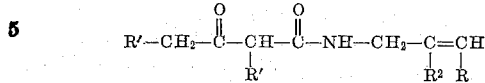

wherein R is hydrogen or methyl, R' is hydrogen or a hydrocarbon radical which may be aliphatic or aromatic and R² is hydrogen, methyl or halogen (preferably chlorine) with a common polymerizable vinyl monomer (preferably acrylamide). A number of specific compounds of this type are disclosed in my copending application, filed May 2, 1947, Serial No. 745,649, and the water-soluble products obtained, as described in the said application, may be employed in practicing the present invention. A third type of polymeric product containing free keto groups which may be employed in practicing the present invention are the water-soluble interpolymers of the type described in my copending application, filed May 2, 1947, Serial No. 745,450, obtained by polymerizing a mixture of a major amount of an acrylamide and a minor amount of a β,γ-ethylenically unsaturated lower aliphatic alcohol ester of acetoacetic acid. While thermo-reversible gels may be produced while employing a wide variety of polymers of this last-mentioned type which contain a free keto group, I preferably employ the interpolymers produced in accordance with my last-mentioned application when employing at least 70% of an acrylamide during the polymerization, since interpolymers obtained when less than this amount of acrylamide is employed form gels which melt below room temperature and thus have relatively little practical importance. I also prefer to use the interpolymers obtained when at least 5% of the acetoacetic acid ester is used, since the polymeric materials obtained using smaller amounts thereof require excessive amounts of dihydrazide when used as a reactant in the present invention. Still another type of polymeric material which contains free keto groups and which may be employed in practicing the present invention are the water-soluble interpolymers of methyl vinyl ketone with amides of α,β-unsaturated monocarboxylic acids of the formula:

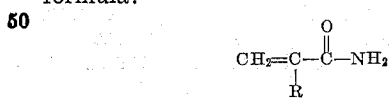

wherein R is hydrogen, lower alkyl (preferably methyl) or halogen (preferably chlorine), e. g. acrylamide, methacrylamide, α-chloroacrylamide, α-fluoroacrylamide or α-bromoacrylamide.

The polyhydrazide of the polycarboxylic acid which is employed as the gelling agent or other reactant in practicing the present invention must be water-soluble and most conveniently can be a water-soluble dihydrazide of a dicarboxylic acid. Specific compounds of this type which have been found to be satisfactory include carbodihydrazide, oxalodihydrazide, malonodihydrazide, succinodihydrazide, glutarodihydrazide, adipodihydrazide, pimelodihydrazide and suberodihydrazide.

In practicing the present invention, water-soluble dihydrazide is generally employed in an amount within the range of 0.05% to 5% by weight of the water-soluble polymer. The particular amount employed depends, to a large extent, on the particular reactants, and the optimum amount of dihydrazide to be employed can readily be determined by those skilled in the art by simple preliminary experiments. I have found that as the relative number of keto groups in the polymer increases the relative amount of dihydrazide employed may be decreased.

Thermo-reversible gels are readily produced by mixing an aqueous solution of the polymeric material containing a free keto group with an aqueous solution of the water-soluble dihydrazide. The solutions of polymer and dihydrazide which are mixed are advantageously of such concentration that the resulting mixture and the gels formed therefrom will contain the desired amount of water. In general, it is desirable to produce gels containing from 4% to 10% by weight of polymer and dihydrazide combined, and solutions from 3% to 15% by weight of these reactants may be used to advantage. As previously indicated, the gels are formed from solutions which are acidic, i. e. which have a pH of less than 7 and preferably within the range of 1 to 6, and the pH of the mixture of polymer and dihydrazide solutions should be adjusted so as to fall within this range. I have found that standard buffers and water-soluble carboxylic acids may advantageously be employed to adjust the pH of the mixture. Examples of such acids include formic, acetic, propionic, butyric, isobutyric, glycolic, citric, succinic, glutaric, etc. acids. If the gels are to be used as gelatin substitutes in photographic emulsions, it is important that the material employed to adjust the pH does not exert deleterious activity in the photographic emulsions. The mixing and gelation can advantageously be carried out at ordinary temperatures but temperatures as high as 80° C. have been used.

The following specific examples illustrate preferred embodiments of the present invention. The parts are by weight.

EXAMPLE 1

To a solution of 300 parts of completely hydrolyzed polyvinyl alcohol having a viscosity (4% water solution) of 24 centipoises at 20° C., dissolved in 2700 parts of anhydrous dimethyl formamide, was added slowly, with stirring, 108 parts of diketene dissolved in 108 parts of anhydrous dimethyl formamide while maintaining the temperature at 120° C. during the course of 1½ hours. After the addition of the diketene was complete, the product was precipitated by pouring the hot solution into 6400 parts of methanol with vigorous mixing. After drying, there was obtained 335 parts of the partial acetoacetic acid ester of polyvinyl alcohol in which 18.9% of the theoretical hydroxyl groups were acylated.

Preparation of a photographic emulsion

The following solutions were prepared.

Solution 1.—100 parts of distilled water, 14 parts of potassium bromide, 0.2 part of potassium iodide, 0.4 part of sodium chloride and 40 parts of a 10% water solution of the product obtained above.

Solution 2.—200 parts of water, 20 parts of silver nitrate, 20 parts of 29% ammonium hydroxide.

Solution 3.—460 parts of a 10% water solution of the product obtained above, 220 parts of a 10% water solution of citric acid.

Solution 4.—38 parts of a 2% solution of adipodihydrazide.

A photographic emulsion was prepared by adding, during the course of 15 minutes, solution 2 maintained at 40° C. to solution 1, also at 40° C. To solution 3 was added the mixture of solutions 1 and 2 and the resultant mixture stirred for 4 minutes, after which solution 4 was added. The pH of the resultant emulsion was 4.7 and gelation took place in about 2.5 minutes. After chilling, the emulsion was washed for 1½ hours with distilled water. The emulsion became fluid when heated to approximately 55–60° C. and was coated onto photographic paper at 65° C.

The coated paper obtained was exposed to a negative photographic image and developed, using standard photographic procedures. There was thus obtained a photographic print exhibiting clear highlight portions, good gradation and deep black in the shadow portions of the image and having speeds equal to or slightly greater than that of standard soft photographic contact printing, developing out paper. The finished print, upon immersion in boiling water for 5 minutes, showed no deleterious results.

EXAMPLE 2

One hundred fifty parts of polyvinyl alcohol, having a viscosity of 24 centipoises at 20° C. (4% water solution) was dissolved in 1350 parts of dimethyl formamide by heating at 140° C. To this solution was added, with stirring, 80 parts of diketene dissolved in 80 parts of dimethyl formamide while maintaining the solution at 140° C. The hot solution was precipitated by slowly pouring it into 3600 parts of rapidly agitated methanol. After drying, there was obtained a good yield of the partial acetoacetic acid ester of polyvinyl alcohol in which 10% of the available hydroxyl groups were acylated. The partial ester was dissolved in 1500 parts of water to form a clear, viscous solution. The pH of 5% aqueous solutions of the ester was adjusted by addition of 25% citric acid solutions. To 25-gram portions of these 5% aqueous solutions of the polymer was added 1-gram portions of a 2% adipodihydrazide solution. The variation of melting points and gelling points of the resultant emulsions are shown in the following table.

| pH | Melting Point | Gelling Point |
|---|---|---|
| | °C. | °C. |
| 2.5 | 50 | 35 |
| 3.0 | 55 | 45 |
| 4.0 | 65 | 48 |
| 5.0 | 70 | 46 |
| 6.0 | 74 | 55 |

Silver halide emulsions were prepared and coated on paper in the manner described in Example 1. Contact prints prepared from the sensitized paper using conventional photographic procedures possessed good gradation and clear highlights.

EXAMPLE 3

To a solution of 150 parts of completely hydrolyzed polyvinyl alcohol having a viscosity (4% water solution) of 51 centipoises at 20° C., dissolved in 1350 parts of anhydrous dimethyl formamide was added slowly during the course of 15 minutes, with stirring, 18 parts of diketene dissolved in 18 parts of anhydrous dimethyl formamide while maintaining the temperature at 140° C. After the addition of the diketene was complete, the product was precipitated by pouring the hot solution into 3500 parts of dry benzene. After drying, the yellow fibrous partial acetoacetic acid ester of polyvinyl alcohol, in which 6.8% of the theoretical hydroxyl groups were acylated, was redissolved, with stirring and heating, to 100° C. in 1400 parts of water to form a highly viscous solution. Twenty-five-part portions of a 5% aqueous solution of the partial ester were adjusted to various pH's by the addition of 25% citric acid solutions. One-part-portions of a gelling agent consisting of a solution of 2% adipodihydrazide in water acidified with a small amount of acetic acid were added to the modified polyvinyl alcohol obtained above to obtain gelation of product. The variations of the melting point and gelation point with pH are shown in the following table.

| pH | Melting Point | Gelation Point |
|---|---|---|
|  | °C. |  |
| 2.5 | 43 | 36° C. soft gel. |
| 3.0 | 51 | 44° C. soft gel. |
| 4.0 | 57 | 46° C. fairly stiff gel. |
| 5.0 | >80 |  |

In a similar experiment in which 7.6% of the available hydroxyl groups in polyvinyl alcohol, having a viscosity (4% water solution) of 25 centipoises at 20° C., are reacted with diketene and subsequently treated with adipodihydrazide in the monomer indicated above, the variation of the melting point and gelation point with pH are shown in the following table.

| pH | Melting Point | Gelation Point |
|---|---|---|
|  | °C. |  |
| 2.5 | 46 | 25° C. soft gel. |
| 3.0 | 58 | 45° C. soft gel. |
| 4.0 | 66 | 58° C. soft gel. |
| 5.0 | >75 |  |

EXAMPLE 4

Polyvinyl alcohol having a viscosity of 25 centipoises at 20° C. (4% water solution) was dissolved in anhydrous dimethyl formamide by heating at 140° C. Sufficient diketene dissolved in dimethyl formamide to theoretically acylate 16% of the available hydroxyl groups and the polyvinyl alcohol was then added to the solution of the polyvinyl alcohol in dimethyl formamide while maintaining the temperature of the reaction mixture at 140° C. The partial acetoacetic acid ester polyvinyl alcohol thus obtained was precipitated from the dimethyl formamide by pouring the reaction mixture into a large volume of methanol. After drying, the polymeric product was dissolved in water and the solution diluted with water until a concentration of 5% polymer was obtained. To 25-part portions of the resulting aqueous solution was added small amounts of 2% solutions of carbodihydrazide, malonodihydrazide and adipodihydrazide respectively, in 2% acetic acid. The variation of melting and setting points of the gels obtained with variations in gelling agent and amount of gelling agent is shown in the following table.

| Gelling Agent | Amount of Gelling Agent in Solution Parts | Time of Gelation at 32° C., in Minutes | Melting Point, °C. | Gelation Point, °C. |
|---|---|---|---|---|
| Carbodihydrazide | 0.5 | 2⅝ | 80 | 81 |
| Malonodihydrazide | 1.0 | 5½ | 67 | 55 |
| Do | 2.0 | 4½ | 85 | 75 |
| Adipodihydrazide | 1.0 | 3½ | 62 | 50 |
| Do | 2.0 | ¾ | 94 | 87 |

EXAMPLE 5

To 25 parts of a 5% aqueous solution of an acrylamide/allyl acetoacetate interpolymer of high viscosity which contained 10% by weight of allyl acetoacetate, was added 1 part of a 2% solution of adipodihydrazide in 4% acetic acid. The resulting mixture had a pH of 5. In a few minutes gelation occurred and the resulting soft gel melted upon heating to 80° C. and regelled upon cooling. The gel strength (weight required to immerse a 20 mm. test tube into the gel to various depths) at 25° C. was 11 g., 27 g. and 50 g. for immersions of 5, 10 and 15 mm. respectively.

EXAMPLE 6

To 25 parts of a 10% aqueous solution of an acrylamide/allyl acetoacetamide interpolymer of low viscosity which contained 20% by weight of allyl acetoacetamide, was added 1 part of a 2% solution of adipodihydrazide in 4% acetic acid. The resulting mixture had a pH of 5. In about 15 minutes gelation occurred and the resulting gel melted upon heating to about 40° C. and regelled upon cooling. The gel strength at 25° C. was 11 g., 30 g. and 47 g. for immersion of 5, 10 and 15 mm. respectively.

EXAMPLE 7

To 10 parts of a 10% aqueous solution of an acrylamide/methyl vinyl ketone interpolymer (interpolymer prepared by polymerizing a mixture of 35 parts of acrylamide and 5 parts of methyl vinyl ketone dissolved in absolute ethyl alcohol using an ultra-violet light as the initiator) was added 0.5 part of a 2% solution of adipodihydrazide in 2% acetic acid. The pH of the resulting solution was 5. After standing at room temperature for a short time, a soft gel formed which melted at 60° C. and regelled upon cooling.

As indicated in the above examples, the thermo-reversible gels produced in accordance with the present invention are of particular value as gelatin substitutes in the production of light-sensitive silver halide photographic emulsions. The usual techniques employed for the production of gelatin-silver halide photographic emulsions can be employed for producing the novel light-sensitive photographic emulsions of this invention by merely substituting the thermo-reversible gels of the present invention for the gelatin gels normally used. In addition to the light-sensitive silver halide salt, these emulsions may contain other functional ingredients commonly employed in photographic emulsions such as sensitizing dyes, color formers thus produced, and similar additives. The photographic silver halide emulsions containing the novel thermo-reversible gels of this invention in place of gelatin can then be cast, by the techniques commonly employed in the manufacture of photographic light-sensitive materials, on a suitable transparent or translucent, rigid or flexible base material commonly employed in the manufacture of photographic plates and films such as glass, cellulose nitrate or cellulose acetate film bases or films of other organic film-forming polymeric materials useful for the production of photographic films, or on paper and similar materials used in the manufacture of photographic printing papers, etc. In addition to the light-sensitive photographic emulsion layer in which the novel thermo-reversible gels of the present invention are employed, the thus-produced photographic materials may contain other coatings such as filter layers, anti-halation layers, antistatic layers, etc. which are usual in photographic films and papers, and they may be exposed, developed, and otherwise processed in accordance with usual photographic techniques.

I claim:

1. The process of producing a thermoreversible gel which comprises treating in acidified aqueous solution a water-soluble polymeric material containing free keto groups in at least about 4.5 per cent of the recurring radicals in said polymeric materials, said water-soluble polymeric material being selected from the group consisting of acylated polyvinyl alcohol obtained by acylating a water-soluble polyvinyl alcohol whose 4% aqueous solution has a viscosity of from 15 to 30 centiposes at 20° C. with diketene, interpolymers of 70 to 95% of an acrylamide with 30 to 5% of an allylacetoacetate, interpolymers of amides of $\beta$-oxocarboxylic acids and $\beta,\gamma$-ethylenically unsaturated lower aliphatic amines and interpolymers of methyl vinyl ketone with amides of $\gamma$-$\beta$-unsaturated monocarboxylic acids containing 3 to 4 carbon atoms; with a water-soluble polyhydrazide of a polycarboxylic acid.

2. The thermoreversible gel obtained by the process defined in claim 1.

3. The process as defined in claim 1 wherein said polyhydrazide is a dihydrazide of a dicarboxylic acid.

4. The thermo-reversible gel obtained by the process defined in claim 3.

5. The process as defined in claim 1 wherein the water soluble polymeric material specified is an acylated polyvinyl alcohol obtained by acylating a water soluble polyvinyl alcohol whose four per cent aqueous solution has a viscosity of 15 to 30 centipoises at 20° C. with diketene to the extent that from 4.5 to 10 per cent of the available hydroxy groups of said polyvinyl alcohol is acylated and wherein said polyhydrazide specified is a dihydrazide of a dicarboxylic acid.

6. The thermo-reversible gel obtained by the process defined in claim 5.

7. The process as defined in claim 1 wherein the said polymeric material specified is an interpolymer of from 70 to 95 per cent of an acrylamide with 30 to 5 per cent of an allylacetoacetate and wherein the polyhydrazide specified is a dihydrazide of a dicarboxylic acid.

8. The thermo-reversible gel obtained by the process defined in claim 7.

9. The process as defined in claim 1 wherein the polymeric material specified is an interpolymer of N-allylacetoacetamide and an acrylamide and wherein the polyhydrazide specified is a dihydrazide of a dicarboxylic acid.

10. The thermo-reversible gel obtained by the process defined in claim 9.

GIFFIN D. JONES.

REFERENCES CITED

The following references are of record in the file of this patent:

UNITED STATES PATENTS

| Number | Name | Date |
|---|---|---|
| 2,145,345 | Dreyfus | Jan. 31, 1939 |
| 2,234,186 | McDowell et al. | Mar. 11, 1941 |
| 2,286,215 | Lowe | June 16, 1942 |
| 2,384,072 | Brubaker | Sept. 4, 1945 |
| 2,395,642 | Prichard | Feb. 26, 1946 |

OTHER REFERENCES

Mason-Manning: "The Technology of Plastics and Resins," pages 40–41, Van Nostrand, New York 1945.

Bulow et al.: Berichte, vol. 39, pages 3372–77, abstracted in Chem. Abstracts, vol. 1, page 296 (1907).

Curtius et al.; J. prakt Chem., vol. 91, pages 1–38 (1915), abstracted in Chem. Abstracts, vol. 9, pages 1605–7.